(12) United States Patent
Everly et al.

(10) Patent No.: US 11,694,213 B1
(45) Date of Patent: Jul. 4, 2023

(54) ELECTRONIC MANAGEMENT OF LICENSE DATA

(71) Applicant: State Farm Mutual Automobile Insurance Company, Bloomington, IL (US)

(72) Inventors: Shawn Everly, Bloomington, IL (US); Randall Kirchner, Dawsonville, GA (US); Steve Schierholz, Bloomington, IL (US); Joseph Waldmann, Bloomington, IL (US); Nancy Warden, Cumming, GA (US); William T. Malone, Decatur, IL (US); Troy Steffen, Fairbury, IL (US); Alex George Sarris, Eureka, IL (US); Matthew Jared Schroeder, Bloomington, IL (US); Matthew Jeffrey Wilkens, Bloomington, IL (US); William G. Baker, Towanda, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 103 days.

(21) Appl. No.: 17/112,205

(22) Filed: Dec. 4, 2020

Related U.S. Application Data

(60) Provisional application No. 62/943,410, filed on Dec. 4, 2019.

(51) Int. Cl.
*G06Q 30/00* (2023.01)
*G06Q 30/018* (2023.01)
(Continued)

(52) U.S. Cl.
CPC ..... *G06Q 30/0185* (2013.01); *G06F 16/2379* (2019.01); *G06F 16/2455* (2019.01);
(Continued)

(58) Field of Classification Search
CPC .................................................. G06Q 30/0185
See application file for complete search history.

(56) References Cited

U.S. PATENT DOCUMENTS

| 8,234,222 B2 | 7/2012 | Thompson et al. |
| 9,058,610 B2 | 6/2015 | Gharavy |

(Continued)

OTHER PUBLICATIONS

Rhoad's Online Institute; "About Our PCRM Software", Product Page, 4 Pages; retrieved Dec. 4, 2020 from the Internet: https://www.rhoadsonline.com/about-our-pcrm-software/.
(Continued)

*Primary Examiner* — Scott C Anderson
(74) *Attorney, Agent, or Firm* — Armstrong Teasdale LLP

(57) ABSTRACT

A computer system including a processor in communication with a memory and a database may be provided. The processor may be programmed to: (i) execute a query on the database including a list of user identifiers associated with a plurality of users, (ii) receive license data associated with the user identifiers including a list of licenses and respective license renewal data associated with each user, (iii) determine, from the license data, that one or more licenses of a group of users is in a renewal period, (iv) notify each user of the group of users of the one or more licenses in the renewal period, (v) pre-populate a license renewal application for the one or more licenses in the renewal period the group of users, (vi) transmit the pre-populated application to be approved by the group of users, and (vii) receive the approved pre-populated application from the group of users.

20 Claims, 8 Drawing Sheets

(51) Int. Cl.
*G06Q 10/105* (2023.01)
*G06Q 10/10* (2023.01)
*G06Q 40/08* (2012.01)
*G06Q 50/20* (2012.01)
*G06N 5/04* (2023.01)
*G06Q 10/1093* (2023.01)
*G06F 16/2455* (2019.01)
*G06F 16/23* (2019.01)
*G06F 16/9535* (2019.01)
*G06N 20/00* (2019.01)
*G06Q 30/0204* (2023.01)

(52) U.S. Cl.
CPC ........... *G06F 16/9535* (2019.01); *G06N 5/04* (2013.01); *G06N 20/00* (2019.01); *G06Q 10/103* (2013.01); *G06Q 10/105* (2013.01); *G06Q 10/1095* (2013.01); *G06Q 30/0205* (2013.01); *G06Q 40/08* (2013.01); *G06Q 50/2057* (2013.01)

(56) References Cited

U.S. PATENT DOCUMENTS

| | | | |
|---|---|---|---|
| 9,483,794 B2* | 11/2016 | Amtrup | G06V 30/412 |
| 9,779,129 B1* | 10/2017 | Lequeux | G06F 16/24 |
| 10,032,039 B1* | 7/2018 | Milman | H04L 51/02 |
| 2002/0120477 A1 | 8/2002 | Jinnett | |
| 2004/0230495 A1* | 11/2004 | Lotvin | G06Q 30/0601 |
| | | | 705/26.1 |
| 2011/0246382 A1 | 10/2011 | Allen et al. | |
| 2016/0125421 A1 | 5/2016 | Levin et al. | |
| 2017/0200170 A1* | 7/2017 | Curry, Jr. | G06Q 30/018 |
| 2018/0096300 A1* | 4/2018 | Boye | G06Q 30/0283 |
| 2018/0204282 A1* | 7/2018 | Painter | G06Q 40/025 |
| 2019/0026807 A1* | 1/2019 | Terada | G06Q 30/0619 |

OTHER PUBLICATIONS

Sircon; "Sircon for Agencies", Product Pages, 2 Pages; retrieved Dec. 4, 2020 from the Internet: https://www.sircon.com/products/agencies/index.jsp.

* cited by examiner

ELECTRONIC MANAGEMENT OF LICENSE DATA

CROSS-REFERENCE TO RELATED APPLICATIONS

The present application claims the benefit of priority of U.S. Provisional Patent Application Ser. No. 62/943,410, filed Dec. 4, 2019, the contents of which are hereby incorporated by reference, in its entirety and for all purposes, herein.

FIELD OF THE DISCLOSURE

The present disclosure relates to utilizing an electronic management system of license data, and more particularly, to systems and methods for utilizing an electronic management system to automatically renew licenses, process license and license renewal applications, and ensure compliance with rules and regulations associated with licenses and license renewals, especially for insurance sales purposes.

BACKGROUND

To sell insurance products (e.g., on behalf of an insurance provider), users need different licenses and typically need to meet other requirements (e.g., training or continuing education) as well. The licenses are generally state-specified based upon the state(s) where the user sells insurance products, and different licenses may be needed for different insurance products (e.g., health, home, vehicle, etc.). Further, most of the licenses are only active for a specific period of time and must be renewed occasionally (e.g., every year, every other year, etc.).

In some instances, when users obtain the necessary licenses and satisfy the other requirements for the insurance provider, the users may request an appointment from the insurance provider that allows the users to sell insurance products on behalf of the insurance provider. Accordingly, the insurance providers must track and manage a variety of information (e.g., license information, other requirement information, appointment information, etc.) for a multitude of different users. This information can be difficult to maintain and track to ensure that each user selling insurance products on behalf of the insurance provider is in compliance with state-mandated and insurance provider-specified requirements. Accordingly, there is a need for a comprehensive insurance license management system that can manage licenses and requirements and make sure that each user is compliant.

BRIEF SUMMARY

The present embodiments relate to systems and methods for managing insurance licenses (e.g., for insurance sales personnel that sell insurance products on behalf of insurance providers). In at least one exemplary embodiment, a license management server may be used to manage the insurance licenses, ensure that users are in compliance with the requirements of the insurance licenses, and process applications for license renewals. In at least one exemplary embodiment, the license management server may be hosted by and/or in communication with an insurance provider.

In one aspect, a computer system may be provided. The computer system may be in communication with at least one processor in communication with at least one memory, and at least one database, and the at least one processor may be programmed to: (i) execute at least one query on the database, wherein the query includes a list of user identifiers associated with a plurality of users, (ii) receive, from the database, license data associated with the list of user identifiers, wherein the license data includes at least a list of licenses and respective license renewal data associated with each user of the plurality of users, (iii) determine, from the license data, that one or more licenses of a group of users is in a renewal period, (iv) notify each user of the group of users of the one or more licenses in the renewal period, (v) pre-populate a license renewal application for the one or more licenses in the renewal period for each user of the group of users, (vi) transmit the pre-populated application to be approved by each user of the group of users, and (vii) receive the approved pre-populated application from each user of the group of users. The computer system may include additional, fewer, or alternative functionality, including those discussed elsewhere herein.

In another aspect, a computer-implemented method may be provided. The method may be implemented on a computer system including at least one processor in communication with at least one memory device, and at least one database, and the method may include: (i) executing at least one query on the database, wherein the query includes a list of user identifiers associated with a plurality of users, (ii) receiving, from the database, license data associated with the list of user identifiers, wherein the license data includes at least a list of licenses and respective license renewal data associated with each user of the plurality of users, (iii) determining, from the license data, that one or more licenses of a group of users is in a renewal period, (iv) notifying each user of the group of users of the one or more licenses in the renewal period, (v) pre-populating a license renewal application for the one or more licenses in the renewal period for each user of the group of users, (vi) transmitting the pre-populated application to be approved by each user of the group of users, and (vii) receiving the approved pre-populated application from each user of the group of users. The method may include additional, fewer, or alternative actions, including those discussed elsewhere herein.

In yet another aspect, at least one non-transitory computer-readable storage media having computer-executable instructions there on may be provided. When executed by at least one processor in communication with at least one memory device and at least one database, the computer-executable instructions may cause the at least one processor to: (i) execute at least one query on the database, wherein the query includes a list of user identifiers associated with a plurality of users, (ii) receive, from the database, license data associated with the list of user identifiers, wherein the license data includes at least a list of licenses and respective license renewal data associated with each user of the plurality of users, (iii) determine, from the license data, that one or more licenses of a group of users is in a renewal period, (iv) notify each user of the group of users of the one or more licenses in the renewal period, (v) pre-populate a license renewal application for the one or more licenses in the renewal period for each user of the group of users, (vi) transmit the pre-populated application to be approved by each user of the group of users, and (vii) receive the approved pre-populated application from each user of the group of users. The instructions may direct additional, fewer, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
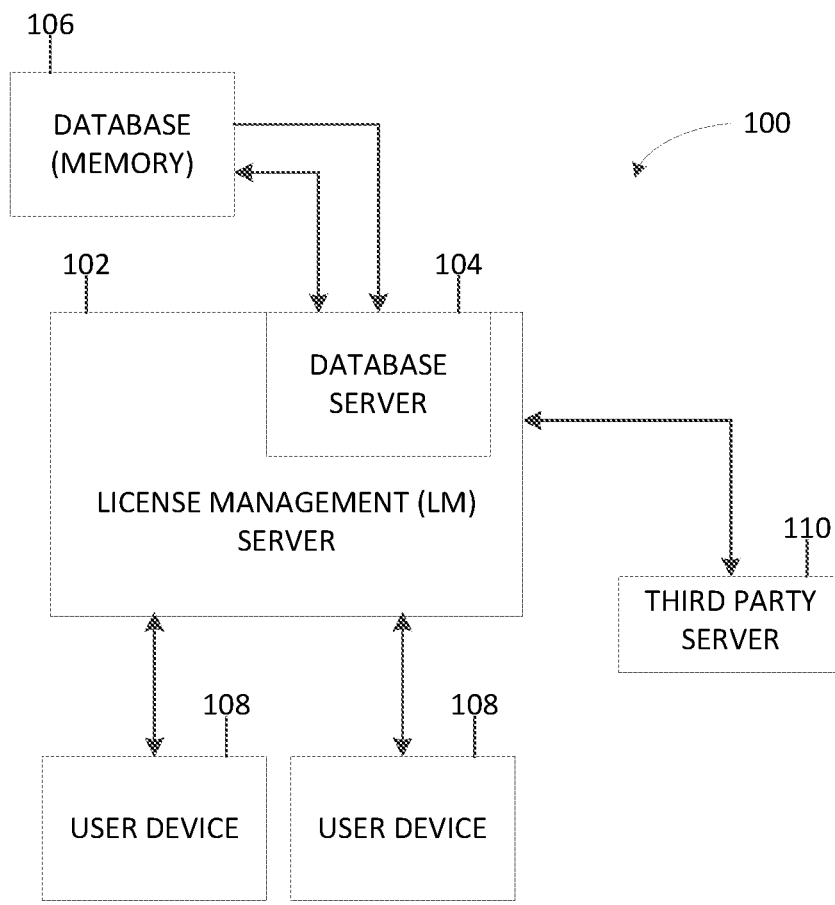
FIG. 1 illustrates a simplified block diagram of an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

Users (e.g., sales personnel including sales representatives and claims representatives, agents, employees, contractors, brokers, etc.) must have proper licensure to sell and solicit insurance products on behalf of an insurance provider. The necessary licensure includes state-based guidelines and product-specific guidelines and depends on the role of the user, the products with which the user is associated, and the state(s) in which the user sells the products. In general, states require users to pass a background check, have a certain number of education hours, and pass a state-administered exam to sell and solicit insurance products. Further, for each insurance product (e.g., home, life, health, workers' compensation, vehicle, etc.) that the user sells, the user must have a line of authority (LOA) license for the products. The LOA licenses may require the user to pass a state-administered exam specific to each LOA. For example, if the user sells home and life insurance, the user must have a home insurance LOA and a life insurance LOA for the state(s) in which the user sells the product. If users wish to sell insurance products in multiple states (e.g., if users live near one or more state borders), the users typically need to be licensed in each state that the users sell insurance products in.

In addition to the state-based guidelines relating to selling and soliciting insurance products, insurance providers may require the users to request (e.g., apply for) an appointment from the insurance provider that allows the users to sell and solicit insurance on behalf of the insurance provider. Some insurance providers may require additional continuing education requirements and/or additional licenses for the users to have an appointment with the insurance provider. For example, the insurance providers may require that the users complete insurance provider-specific training courses and/or have LOA licenses for each insurance product that the insurance provider sells. Both the insurance licenses and the appointments generally have expirations, and users may be required to stay up-to-date on the licenses and appointments to continue selling and soliciting insurance.

Once a user has the necessary licensure and appointment from the insurance provider, the user may start selling and soliciting insurance products on behalf of the insurance provider. In some cases, the user may be an independent contractor/agent, and the user may wish to hire other users (e.g., insurance agents, team members, support staff including administrative support, etc.) to assist them in selling the insurance products. It may be the responsibility of the managing user (e.g., as delegated by the insurance provider) to ensure that team members of the managing user meet the requirements to sell and solicit insurance products.

The present embodiments may relate to, inter alia, systems and methods for managing licenses, especially licenses and corresponding license requirements for selling and soliciting insurance products (e.g., on behalf of the insurance provider). In one exemplary embodiment, the methods may be performed by a license management (LM) server (also referred to herein as an "LM computing device" and an "LM computer system"). In some embodiments, the LM server may be hosted by and/or associated with the insurance provider.

In the exemplary embodiment, the LM server may manage the insurance licenses associated with the users who work for the insurance providers (e.g., the users that have appointments from the insurance provider and/or have applied for appointments with the insurance provider). The LM server may create user profiles including the insurance licenses associated with the users, and the LM server may provide notifications to the users about the insurance licenses (e.g., if an insurance license is in a renewal period and/or if requirements for different licenses have changed). Further, the LM server may group user profiles together based upon a location of work of the users associated with the user profiles, and managing users may be able to view the user profiles of team member users. Accordingly, the LM server may facilitate simple and efficient management of insurance licenses for users and insurance providers.

In the exemplary embodiment, the LM server may be in communication with one or more third party servers associated with third parties that process and store insurance license data. The third party servers may be servers of, for example, the National Insurance Producer Registry (NIPR) and the Financial Industry Regulatory Authority (FINRA®). Further, the third party servers may be servers of third parties associated with continuing education requirements. The license data processed and/or stored by the third party servers (e.g., in databases associated with the third party servers) may include a list of types of licenses associated with the users, renewal period associated with the licenses, current appointment information, historical appointment information including prior appointments and terminations of appointments, LOA data, and/or continuing education data.

The LM server may store (e.g., in a database associated with the LM server) a list of user identifiers and user information associated with the user identifiers. The list of user identifiers may be the user identifiers associated with users that are associated with the insurance provider of the LM server. For example, the list of user identifiers may be a list of users that sell or solicit insurance products on behalf of the insurance provider (e.g., the users that have an appointment from the insurance provider), a list of users that have ever sold or solicited insurance products on behalf of the insurance provider (e.g., the users that had an appointment from the insurance provider at some point in time), and/or a list of users that have applied to sell or solicit insurance products on behalf of the insurance provider (e.g., the users that are in the process of obtaining an appointment from the insurance provider). The user information associated with the user identifiers may include a location of an office for each user, a role (e.g., manager, administrative staff, team member, etc.) of each user, whether each user is an employee or an independent contractor, and any other information associated with the users.

The LM server may transmit the list of user identifiers to the third party servers and request license data (e.g., execute a query on the third party servers/databases of the third party servers) of the users associated with the list of user identifiers. In response to the query, the third party servers may transmit the license data to the LM server. The LM server may store the license data received from the third party servers (e.g., in the database of LM server). The LM server may query the third party servers periodically (e.g., once a week, once a month, every other month, etc.) to keep the license data of the LM server current. Further, the LM server may additionally query the third party servers for specific information (e.g., determining whether licenses of users need to be renewed). In some embodiments, the third party servers may not have license data for users if the users are new and the third party servers are not updated, if the user recently changed addresses/names, the information in the third party server is incorrect, etc. In these embodiments, the LM server may receive license data from the users (e.g., input into a user device in communication with the LM server).

In the exemplary embodiment, the LM server may create a user profile that includes the received license data and the stored user information for each user. For example, the user profile may include each license that the user has and renewal periods associated with each license (e.g., when the license is current through and when it needs to be renewed such that the license does not expire), the states in which the user is licensed to sell and solicit insurance, appointments of the user, the location of the office of the user, the role of the user, a manager/team members associated with the user, historic license data, continuing education data of the user, and any other information that may be of interest to the insurance provider associated with the user and the user themselves.

The LM server may automatically group the user profiles together by the location of the office of the users and/or by the manager/team members associated with the users. For example, if a certain set of users have the same location of office, the LM server may group the user profiles of the users together based upon the location of the office being the same. Further, if a certain set of users have the same manager and/or team members associated with the users, the LM server may group the user profiles of the users together.

The LM server may allow the users to view the user profiles (e.g., through a user device associated with each user). In some embodiments, the LM server may restrict (e.g., based upon the role of the user) access to the user profiles. For example, if the role of a user is a manager and the user manages three users, the user may be able to access/view the user profiles of the three users the user manages. If the role of the user is a team member and/or administrative staff, the user may only be able to access/view the user profile of the user themselves because the user does not manage any users. Further, in some embodiments, the LM server may restrict access to certain information of user profiles. For example, regardless of the role of the user, each user may be able to access/view general information (e.g., name, location of office, etc.) included in the user profile of each other user, while only users with manager roles may be able to access/view specific information (e.g., license data) of the user profiles of the users that the user manages.

In the exemplary embodiment, the LM server may store business rules associated with the insurance provider associated with the LM server. The business rules may include the requirements for each user, depending on the role, insurance products sold/solicited, and location, for each user to be in compliance with the insurance provider and the state(s) in which each user sells/solicits the insurance products of the insurance provider. For example, the business rules may include types of licenses required for each user, LOAs required for each user, and continuing education credits required for each user. The LM server may compare the license information included in each user profile and the business rules associated with each user profile to determine whether each user associated with the respective user profile is in compliance with the business rules of the insurance provider.

For example, if a user in an agent role sells vehicle insurance in California for a specific insurance company, the LM server may perform a look-up of the business rules that are stored to determine the rules that apply to the user both for California and the specific insurance company. The LM server may also perform a look-up of the user profile to determine the licenses and other credentials that the user has. The LM server may compare the required business rules and the licenses and other credentials of the user to determine whether the user is in compliance with the required business rules. If the LM server determines that the user is in compliance with each required business rule, the LM server may update the user profile of the user with a notification that the user is in compliance with each business rule. If the LM server determines that the user is not in compliance with one or more required business rules, the LM server may flag the user profile of the user with a notification that the user is not in compliance with the business rules, and the notification may include a list of the business rules with which the user is not in compliance. Further, the LM server may send a notification (e.g., a text, email, push notification, etc.) directly to the user and/or a manager of the user alerting the user of the compliance discrepancy. Further, the LM server may determine that the user is selling additional insurance besides vehicle insurance and check the business rules associated with the other insurance to determine whether the user is allowed to sell the other insurance.

Additionally or alternatively, the LM server may determine (e.g., using machine learning or artificial intelligence techniques) the requirements for each user based upon user profiles of similar users. For example, if a user sells vehicle, home and life insurance in a specific state, the LM server may use machine learning techniques on user profiles of other users who sell vehicle, home, and life insurance in the specific state to determine which requirements are probably necessary for the user based upon which licenses and other requirements the other users have. Further, the LM server may use machine learning and/or artificial intelligence techniques to learn the licenses that similar users to a specific user have and determine whether the user has the same licenses as the similar users.

For example, the LM server may determine that a specific user sells home insurance in Texas for a specific company. The LM server may generate a query to determine the licenses that similar users (e.g., users who sell home insurance in Texas for the specific company) have and compare the licenses of the similar users to the licenses of the specific user. The LM server may determine which licenses, if any, the specific user does not have that similar users have and notify the specific user (e.g., via email, text, push notification, etc.) about the discrepancy in licensure. Further, the LM server may flag the user profile of the specific user if the LM server determines that there is a discrepancy in licensure, and the flag may include a list of the licenses that the specific user does not have that similar users have.

The LM server may continuously monitor the user profiles to determine whether the user profiles include licenses that need to be renewed soon. If the LM server determines that a user is not in compliance with the business rules and/or determined requirements of the insurance provider and/or that the user has a license that is up for renewal soon, the LM server may provide a notification to the user that informs the user of such. For example, the notification may include a flag on the user profile of the user and/or a notification (e.g., push notification, text, email, etc.) to the user device of the user. Further, if the user is associated with a manager, the LM server may provide a notification to the manager as well. For example, the user profile of the manager may include a notification that a user associated with the manager has a flag on the user profile of the user.

When the LM server provides a notification to a user that one or more of the licenses of the user are in a renewal period, the LM server may further provide an application for renewal to the user corresponding to the license in the renewal period. For example, if the LM server determines that a home insurance LOA and state license for the user are in renewal periods, the LM server may also provide the home insurance LOA application for renewal and state license application for renewal to the user. Further, the LM server may pre-populate the one or more applications for renewal based upon the stored user information. The LM server may prompt the user to review the pre-populated application, fill out any missing information in the application, edit any incorrect information in the pre-populated application, and/or verify that the information in the pre-populated application is correct. For example, if all of the information in the pre-populated application is correct, the user may verify (e.g., using "one click") that the application is correct. Accordingly, the submitting the application for renewal through the LM server requires minimal user input. The LM server may also provide or prompt the user to provide any necessary accompaniments to the application (e.g., payment for renewal) through the LM server. The LM server may transmit the application to the third party associated with the license renewal (e.g., NIPR and/or FINRA®) on behalf of the user such that the user does not have to directly interact with the third parties. The LM server may then receive, once the third party has processed the application, verification that the application has been processed and new information regarding the license (e.g., a new renewal period). The LM server may update the user profile(s) in response to receiving that the application has been processed and new information regarding the license. Accordingly, the LM server automatically determines that one or more licenses of the user are up for renewal, notifies the user, allows the user to renew the license through the LM server, and transmits the application to the third party on behalf of the user such that the user has a seamless and efficient renewal process and does not have to manage their licenses or deal with third parties to renew their licenses.

If the LM server provides a notification to a user that the user is not in compliance with the business rules and/or determined requirements of the insurance provider, the LM server may allow the user to provide user input regarding the non-compliance. For example, if the user is a new hire and the user does not have an appointment from the insurance provider or a certain required license, the user may provide input indicating that the user has applied for the appointment from the insurance provider and is waiting for a response from the insurance provider and that the user is signed up to take the test for the required license on a certain date. The user input may be included in the user profile such that the user and a manager of the user can view the user input.

In some embodiments, the LM server may flag certain profiles of users that were terminated by managers and/or were otherwise determined to be problematic employees. Accordingly, if the user subsequently tries to request an appointment from the insurance provider and/or work for another manager, the LM server may automatically deny the requests of the user based upon the flag.

The LM server may generate work items for each user profile of each user, and the work items may include tasks associated with maintaining compliance for users. In some embodiments, the LM server may automatically generate and track the work items for each user profile. Further, the LM server may assign the work items to different users based upon the work item, and the LM server may send notifications to the users about the work items if the work items are time-sensitive. For example, if a user (e.g., an independent contractor that manages a team) hires a new team member, the LM server may generate a work item for the user indicating that the user needs to upload a work agreement between the user and the new team member, and a work item for the new team member indicating that the new team member needs to apply for appointment from the insurance provider associated with the user. Further, the LM server may generate a work item for an administrative assistant of the user to file/upload the agreement for the user.

Further, the LM server may generate and store custom reports (e.g., a license analytics request) based upon user-specified metrics. For example, a user (e.g., an independent contractor that manages a team in two office locations) may be looking to expand their business to a third location. Accordingly, the user may request a report from the LM server of the metrics (e.g., how many licensed users, how many offices, etc.) of the location to determine whether the location would be a good fit for the user or if the location is already saturated with other users. Accordingly, the LM server may assist users with business development and license analytics.

At least one technical problem addressed by this system include: (i) inefficient managing of licenses associated with a plurality of users (e.g., insurance sales personnel and/or brokers), especially licenses related to selling insurance; (ii) lack of a comprehensive license management system that can, for example, make sure (a) that users have all of the necessary requirements for roles associated with the users, (b) that the licenses of the users are current and not expired, and (c) notify users and a manager of the user if the user does not have the necessary requirements for the role of the user; (iii) inefficient license renewal processes for the users that may require the users to reach out to multiple third parties and an insurance provider where the user is an employee/contractor to renew their licenses; and/or (iv) lack of user profiles that are easily viewable by the users and managers of the users and include the licenses and other requirements (e.g., continuing education requirements) related to the roles of the users.

A technical effect of the systems and processes described herein may be achieved by performing at least one of the following steps: (i) executing at least one query on the database, wherein the query includes a list of user identifiers associated with a plurality of users, (ii) receiving, from the database, license data associated with the list of user identifiers, wherein the license data includes at least a list of licenses and respective renewal periods associated with each user of the plurality of users, (iii) determining, from the license data, one or more licenses of each user in the renewal period, (iv) notifying each user of the one or more licenses in the renewal period, (v) prompting each user with a pre-populated application for approval, (vi) receiving the approved pre-populated application for renewal for the one or more licenses from each user, and (vii) transmitting the application for renewal to the database for further processing. As a result, smart and efficient management of insurance licenses may be facilitated.

The technical effect achieved by this system may be at least one of: (i) facilitating smart and efficient managing of insurance licenses of users; (ii) providing a smart and comprehensive license management system that can, for example, make sure (a) that users have all of the necessary requirements for roles associated with the users (e.g., as compared to other users in similar roles and/or as determined by business rules), (b) that the licenses of the users are current and not expired, (c) link profiles of managers and team members, and (d) notify users and managers of the users if the users do not have the necessary requirements for the role of the user; (iii) in the comprehensive license management system, providing an easy and efficient way for users to renew licenses of the user through the license management system and without having to contact any third parties in the process or necessarily having to fill out any forms; and/or (iv) providing, through the license management system, user profiles that are easily viewable by the users and managers of the users.

Exemplary Computer System

FIG. 1 depicts a simplified block diagram of an exemplary system 100 for managing insurance licenses for users. System 100 may include a license management (LM) server 102.

In the exemplary embodiment, LM server 102 is in communication with one or more user devices 108 and a third party server 110. LM server 102 is also in communication with a database 106 and may communicate with database 106 through a database server 104. In some embodiments, database server 104 is a component of LM server 102. In other embodiments, database server 104 is separate from LM server 102. In some embodiments, system 100 may include a plurality of LM servers 102, user devices 108, third party devices 110, and/or databases 106.

In the exemplary embodiment, user devices 108 may be computers that include a web browser or a software application, which enables user devices 108 to access remote computer devices, such as LM server 102, using the Internet or other network. More specifically, user devices 108 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Further, LM server 102 may be communicatively coupled to user devices 108 and may receive information (e.g., user input) from user devices 108.

In the exemplary embodiment, LM server 102 may interact with third party server 110 associated with third parties that are associated with (e.g., processing, storing, etc.) insurance license data (e.g., types of licenses, areas and/or locations associated with the licenses, current appointment data, historical appointment data, line-of-authority data, securities and brokering data, etc.). For example, third party server 110 may be a server associated with the National Insurance Producer Registry (NIPR), a server associated with the Financial Industry Regulatory Authority (FINRA®), and/or a server associated with continuing education databases and/or service providers. LM server 102 and third party server 110 may be communicatively coupled to one another through the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. For example, LM server 102 and third party server 110 may be communicatively coupled such that LM server 102 may generate and transmit a query to third party server 110, and third party server 110 may transmit a response to LM server 102 based upon the query. Further, LM server 102 and third party server 110 may be communicatively coupled such that LM server 102 may transmit an application for renewal of a license associated with a user (e.g., which the user may input into user device 108 associated with the user), and third party server 110 may process the application and send a notification to LM server 102 that the application has been processed and updated.

Database server 104 may be communicatively coupled to database 106 that stores data. In one embodiment, database 106 may include user profiles, license data, work items, report data, and continuing education data. Some of the data included in database 106 may be from third party server 110. That is, database 106 may store data from LM server 102 after LM server 102 receives the data from third party server 110 in response to a query transmitted to third party server 110. In the exemplary embodiment, database 106 may be stored remotely from LM server 102. In some embodiments, database 106 may be decentralized. In the exemplary embodiment, a user, may access database 106 via their user device 108 by logging onto LM server 102, as described herein. In some embodiments, access to database 106 and different data included in database 106 may be restricted. For example, if the user is a manager, the user may have access to more information in database 106, whereas if the user is a team member (e.g., support staff or in administration), the user may only have access to information in database 106 related to the user.

In the exemplary embodiment, user devices 108 may include an application and a user interface (not specifically shown). The user interface may be used, for example, to receive notifications from LM server 102 and/or to input information (e.g., user information relating to licenses) to be sent to LM server 102. The application may be, for example, a program or application that runs on user devices 108. In some embodiments, the application may be accessed remotely by user devices 108. The application may be hosted by or stored on LM server 102 and accessed by user devices 108. User devices 108 may provide inputs to LM server 102 via a network which are used by LM server 102 to execute the application. In one embodiment, these inputs may be received by a website hosted by LM server 102. The application and/or website may further provide output to user device 108. User devices 108 may have access to a website (e.g., hosted by LM server 102), the application, or other tools which the user uses to receive and/or view notifications regarding license expirations, notifications related to users having/not having the proper licenses for the role of the user, etc., provided by LM server 102 to the user.

In some embodiments, LM server 102 may be hosted by, part of, or otherwise in communication with an insurance provider. User devices 108 may be associated with users that are employees/contractors for the insurance provider. For example, the users (e.g., associated with user devices 108) may be appointed by the insurance provider to sell and/or broker insurance products and/or securities (e.g., health insurance, car insurance, home insurance, etc.) on behalf of the insurance provider. Accordingly, LM server 102 may allow the insurance provider to manage the licenses of the users and determine whether the users are in compliance with and/or satisfy license requirements associated with the roles of the users.

Exemplary Computer-Implemented Process

Figure 2:
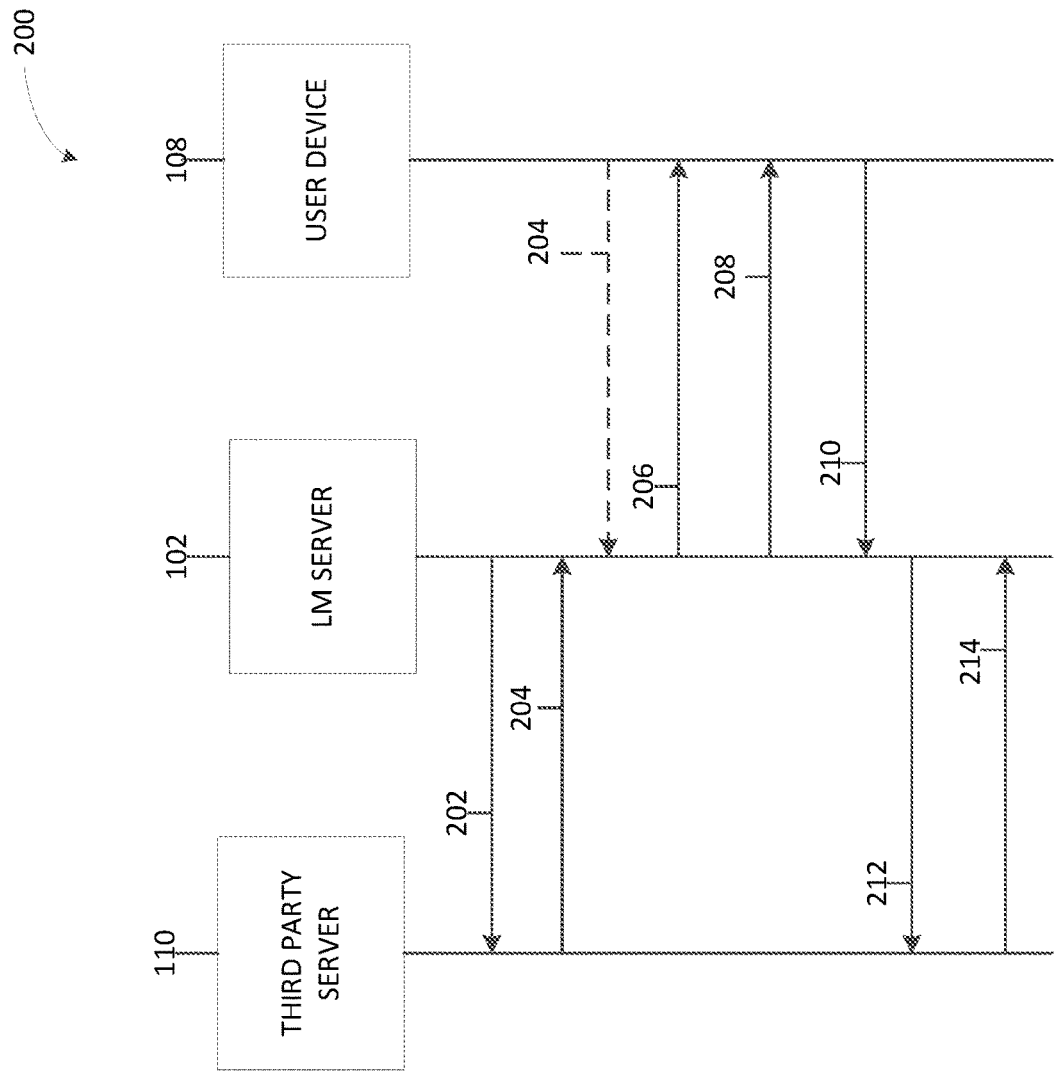
FIG. 2 illustrates a flow chart of an exemplary process that may be carried out by the computer system shown in FIG. 1.

FIG. 2 illustrates a flow chart of an exemplary process 200 for managing insurance licenses. In the exemplary embodiment, process 200 may be carried out by LM server 102, which may be in communication with one or more user device 108 and third party server 110. In some embodiments, LM server 102 may be hosted by and/or in communication with an insurance provider, and user device 108 may be associated with a user that is an employee of or otherwise associated with (e.g., a contractor) the insurance provider (e.g., through selling and/or brokering insurance on behalf of the insurance provider).

LM server 102 may generate and transmit a query 202 to third party server 110, and query 202 may include a list of user identifiers associated with a plurality of users. The list of user identifiers may include the user identifiers of the users associated with (e.g., employees or contractors of) the insurance provider, and query 202 may indicate that all license data 204 associated with the list of user identifiers be transmitted to LM server 102. In some embodiments, the list of user identifiers may include specific user identifiers, and query 202 may indicate that specific license data 204 associated with the list of specific user identifiers be transmitted to LM server 102. For example, LM server 102 may generate a list (e.g., based upon data stored by LM server 102) of user identifiers associated with licenses that may expire soon. Accordingly, query 202 may include that list of user identifiers and indicate that license data relating to the licenses that may expire soon be transmitted to LM server 102. In other embodiments, the list of user identifiers may be any user identifiers, and query 202 may include any list of user identifiers and may indicate that all or just certain license data 204 be transmitted to LM server 102.

In response to query 202, third party server 110 may send requested license data 204 to LM server 102. Additionally or alternatively, if third party server 110 does not have license data associated with one or more users associated with the user identifiers, LM server 102 may request and receive license data 204 from user device 108 (e.g., as entered by the user associated with user device 108 through a user interface). License data 204 may include types of licenses, renewal periods associated with the licenses, areas and/or locations associated with the licenses, current appointment data, historical appointment data, line-of-authority data, securities and brokering data, etc. LM server 102 may store license data 204 and user information (e.g., name, workplace, role, managers/team members, etc.) in a database associated with LM server 102.

LM server 102 may generate a user profile 206 for the user that includes license data 204 and user information. LM server 102 may transmit user profile 206 to user device 108 such that the user can view user profile 206. Further, LM server 102 may link multiple user profiles 206 together based upon workplaces and managers/team members associated with each user. Accordingly, LM server 102 may also transmit user profile 206 to a user device (e.g., allow access to user profile 206) of a manager of the user.

LM server 102 may determine, based upon user profile 206, when certain licenses of the user are in a renewal period. Further, LM server 102 may store business rules associated with the insurance provider associated with the user, and the business rules may include requirements (e.g., necessary licenses and continuing education credits) for the user to sell insurance products on behalf of the insurance provider. LM server 102 may, additionally or alternatively, determine, using machine learning and/or artificial intelligence techniques, requirements of the user based upon comparing user profile 206 to user profiles of other users that are similar to the user. If the LM server 102 determines that a license is in a renewal period and/or determines that the user is not in compliance with the business rules and/or determined requirements, LM server 102 may transmit a notification 208 to user device 108 indicting such. In some embodiments, notification 208 may include an application for renewal for the license, and LM server 102 may pre-populate the application for the user.

In response to receiving notification 208, the user may transmit an edited application 210 and/or a verification 210 that the pre-populated application is correct. LM server may transmit application 210 to third party server 110 for further processing. After application 210 is processed by third party server 110, third party server 110 may transmit a notification 212 to LM server that application 210 has been processed. Notification 212 may include new license information.

Accordingly, LM server 102 may update user profile 206 to include the new license information.

Exemplary Client System

Figure 3:
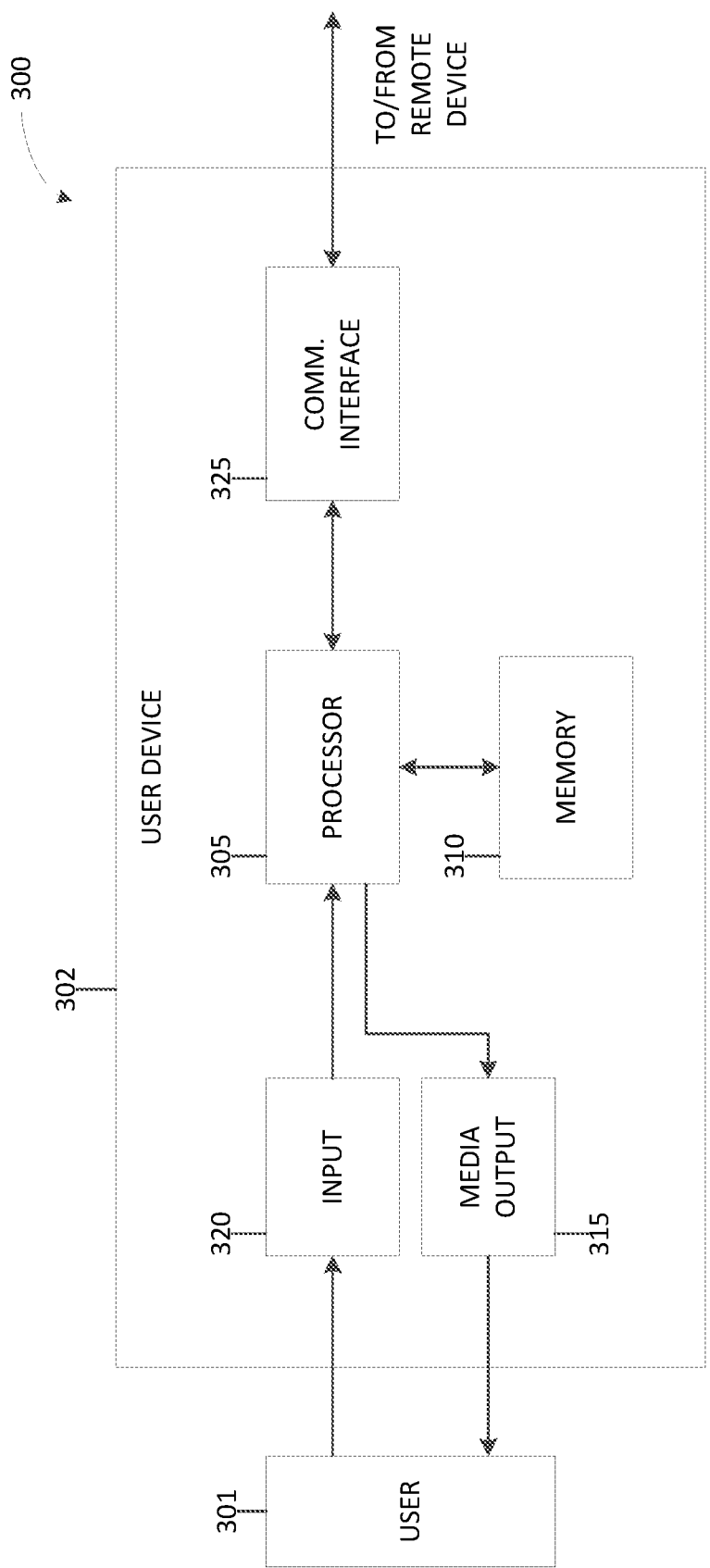
FIG. 3 illustrates an exemplary configuration of a user computer device in accordance with one embodiment of the present disclosure.

FIG. 3 depicts an exemplary configuration 300 of a user computer device 302, in accordance with one embodiment of the present disclosure. User device 302 may be operated by a user 301. User device 302 may include, but is not limited to, user devices 108 (shown in FIG. 1). User device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

User device 302 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or an application) to user 301. In some embodiments, user device 302 may include an input device 320 for receiving input from user 301. User 301 may use input device 320 and/or output device 315 to, without limitation, view one or more user profiles, receive notifications from LM server 102 (shown in FIG. 1) regarding licenses associated with user 301, request and view license analytics report from LM server 102, and provide user input to LM server 102.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User device 302 may also include a communication interface 325, communicatively coupled to a remote device such as LM server 102. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or an application. Web browsers enable users, such as user 301, to display and interact with media and other information typically embedded on a web page or a website from LM server 102. An application may allow user 301 to interact with, for example, LM server 102. For example, instructions may be stored by a cloud service, and the output of the execution of the instructions sent to the media output component 315.

Exemplary Server System

Figure 4:
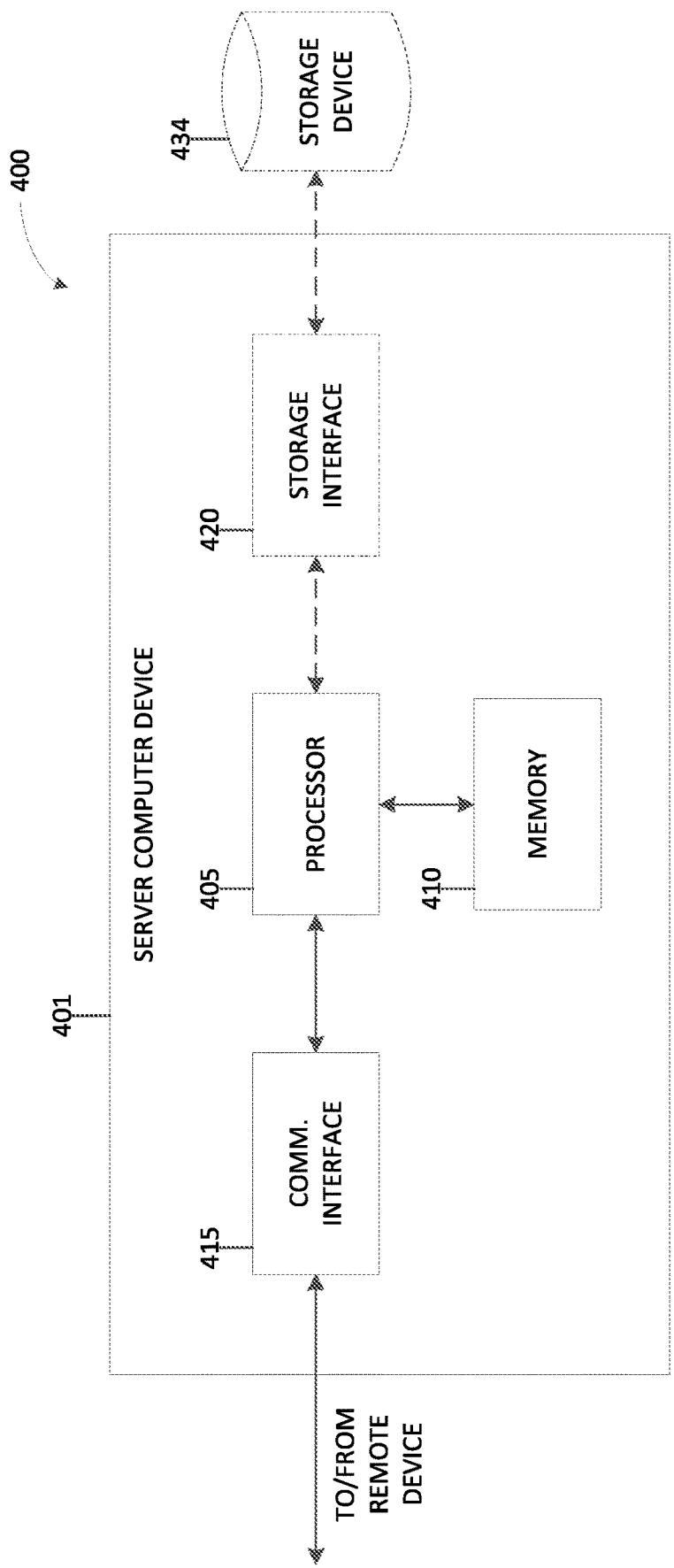
FIG. 4 illustrates an exemplary configuration of a server system in accordance with one embodiment of the present disclosure.

FIG. 4 depicts an exemplary configuration of server system 400, in accordance with one embodiment of the present disclosure. Server computer device 401 may include, but is not limited to, LM server 102, database server 104, and/or third party server 110 (all shown in FIG. 1). Server computer device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 401 is capable of communicating with a remote device such as another server computer device 401 and LM server 102. For example, communication interface 415 may receive requests from user device 108 via the Internet, as illustrated in FIG. 1.

Processor 405 may also be operatively coupled to a storage device 434. Storage device 434 may be any computer-operated hardware suitable for storing and/or retrieving data, such as, but not limited to, data associated with database 106 (shown in FIG. 1). In some embodiments, storage device 434 may be integrated in server computer device 401. For example, server computer device 401 may include one or more hard disk drives as storage device 434.

In other embodiments, storage device 434 may be external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 434 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 6:
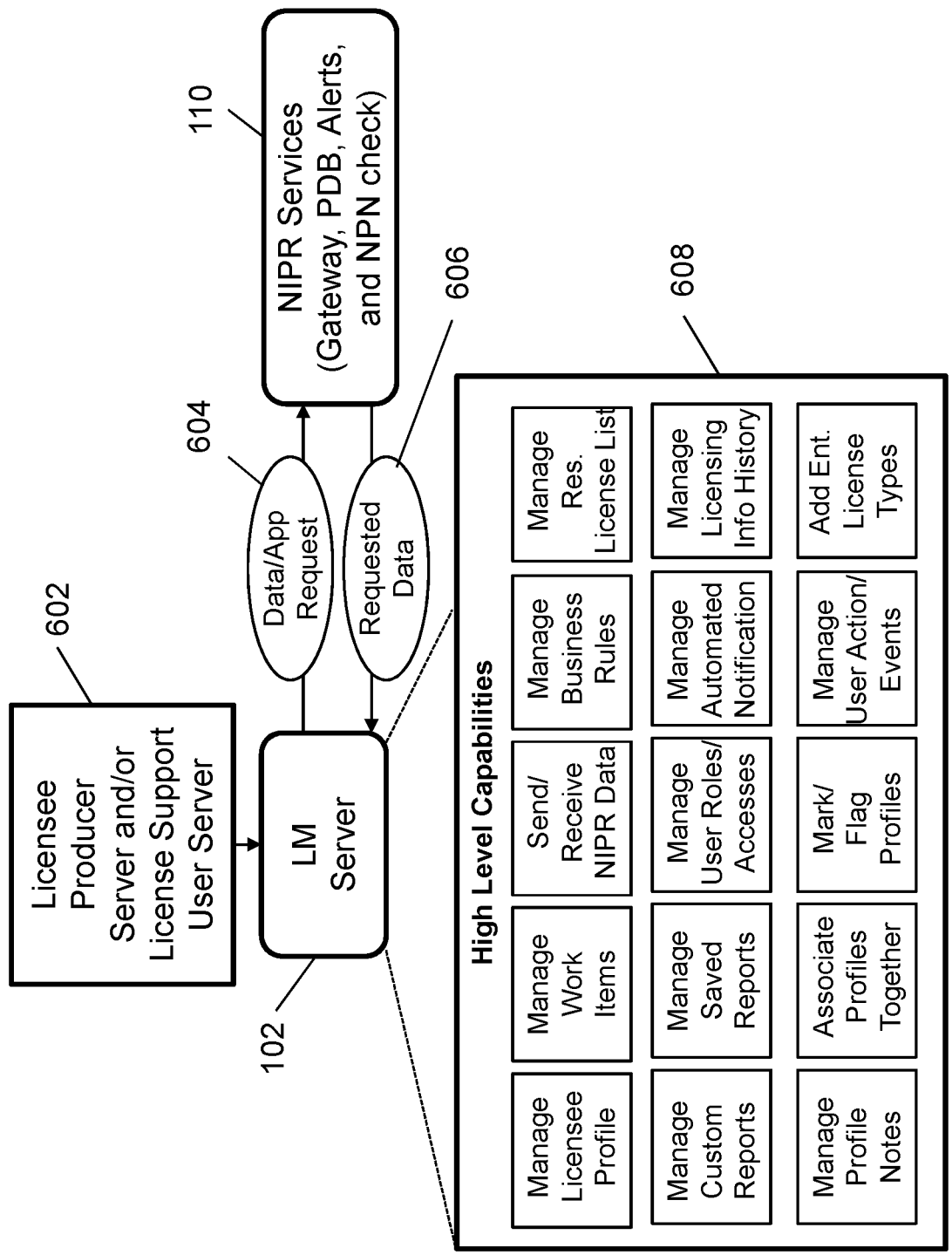
FIG. 6 illustrates another simplified block diagram of the computer system shown in FIG. 1 along with functionality of the computer system.

Processor 405 may execute computer-executable instructions for implementing aspects of the disclosure. In some embodiments, the processor 405 may be transformed into a special purpose microprocessor by executing computer-executable instructions or by otherwise being programmed. For example, the processor 405 may be programmed with the instruction such as illustrated in FIG. 6.

Exemplary Computer Device for Managing Licenses

Figure 5:
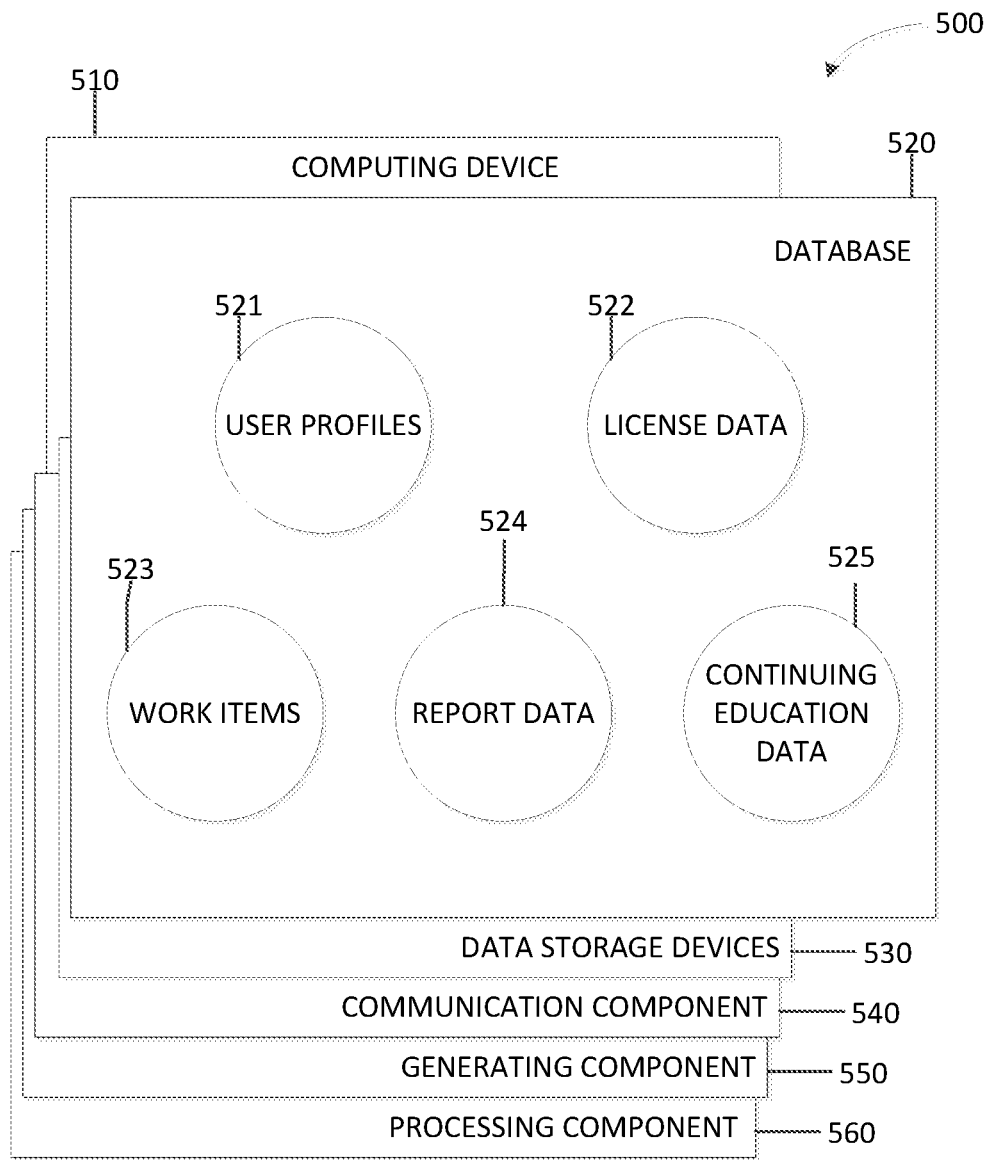
FIG. 5 illustrates a diagram of components of one or more exemplary computing devices that may be used in the computer system shown in FIG. 1.

FIG. 5 depicts a diagram 500 of components of one or more exemplary computing devices 510 that may be used in system 100 shown in FIG. 1 and to implement process 200 shown in FIG. 2. In some embodiments, computing device 510 may be similar to LM server 102 (shown in FIG. 1). Database 520 may be coupled with several separate components within computing device 510, which perform specific tasks. In this embodiment, database 520 may include user profiles 521, license data 522, work items 523, report data 524, and continuing education data 525. In some embodiments, database 520 is similar to database 106 (shown in FIG. 1).

Computing device 510 may include the database 520, as well as data storage devices 530. Computing device 510 may also include a communication component 540 for communicating with different devices (e.g., user device 108, shown in FIG. 1). Computing device 510 may further include a generating component 550 for generating queries, user profiles, and notifications regarding licenses. Moreover, computing device 510 may include a processing component 560 for processing, for example, license data.

Exemplary Functionality of the Computer System

FIG. 6 illustrates exemplary functionality that may be carried out by a computer system and/or processor/server (e.g., LM server 102 shown in FIG. 1). LM server 102 may be in communication with a third party server 110 (e.g., NIPR services) and a licensee producer server 602 and/or a license support user server 602. In some embodiments, licensee producer server 602 and/or license support user server 602 may be associated with a server of an insurance provider.

In the exemplary embodiment, LM server 102 may send a data request 604 (e.g., a data query) and/or an application request 604 to third party server 110. In response to data request 604 and/or application request 604, third party server 110 may send requested data 606 to LM server 102. Further, LM server 102 may receive and store user data associated with users (e.g., agents, sales personnel, administrative staff, etc.) associated with the insurance provider.

LM server 102 may use requested data 606 and user data to carry out certain functionalities 608. Functionalities 608 may include (i) managing licensee profiles (e.g., user profiles), (ii) managing work items, (iii) sending/receiving third party data, (iv) managing custom business rules (e.g., business rules of the insurance provider), (v) managing restricted licensee lists, (vi) managing custom reports, (vii) managing saved reports, (viii) managing user roles/accesses, (ix) managing automated notifications, (x) managing licensing information history, (xi) managing profile notes, (xii) associating user profiles with other user profiles (e.g., associating managers with team members), (xiii) marking/flagging user profiles, (xiv) managing user actions/events, and/or (xv) adding new enterprise license types.

Additional profile-related functionalities, not specifically shown in FIG. 6, may include, for example, (i) viewing all licenses together (e.g., insurance office and individual licenses for producers including users like agents and interns), (ii) viewing all active licenses together for producers, (iii) viewing all licenses and appointments together on one screen (e.g., provided by a user interface), (iv) viewing terminated licenses for a producer, and/or (v) choosing to view old licenses for a producer.

Additional license renewal-related functionalities, not specifically shown in FIG. 6, may include, for example, (i) sending emails with reporting hierarchy (e.g., for an insurance office), and (ii) real-time renewal reminders.

Additional reporting-related functionalities, not specifically shown in FIG. 6, may include, for example, (i) selecting any type of criteria for a reporting report (e.g., on licenses and appointments for each producer), (ii) providing a "one-click" button for displaying the number of active producers and other metrics of interest, (iii) exporting a listing of applicable producers for each category of metric displayed using the "one-click" button, and/or (iv) running a report by alias of individuals who process transactions (e.g., for quality purposes).

Further functionalities, not specifically shown in FIG. 6, may include, for example, (i) holding an appointment transaction for a period of time (e.g., such that any errors may be fixed before the appointment request is sent to a Department of Insurance and/or an automatic issuance state agency), (ii) having an insurance company guide rules and/or all appointing rules and appointment termination rules in a back-end of a license management server (e.g., LM server 102) such that, for example, a technician may enter a license into the management system, and the management system may automatically recognize the state and rules for the state of the entered license (e.g., if a technician enters a Texas Property and Causality license and clicks appoint, the rules stored in the backend of the LM server 102 may know that the license needs to be sent to different departments of the insurance provider including a fire and casualty department and a state-specific department), (iii) tracking any user that makes a change to any record (e.g., for quality purposes), (iv) having a drop down menu for a reason if an unexpected license is added (e.g., if a non-resident license is entered, having a drop down menu of different reasons for the non-resident license being entered), (v) storing state-specific rules about sponsoring members and agency team members (ATMs) (e.g., in California, an ATM can only be sponsored by no more than four sponsoring members), (vi) allowing, via a user interface, a producer profile and appointments to be viewed from any screen, (vii) flagging and/or identifying remote workers, (viii) disallowing any entries if a restriction is entered, and/or (ix) categorizing pending work items and reporting the pending work items.

Exemplary Process for Automatically Applying for Appointments

Figure 7:
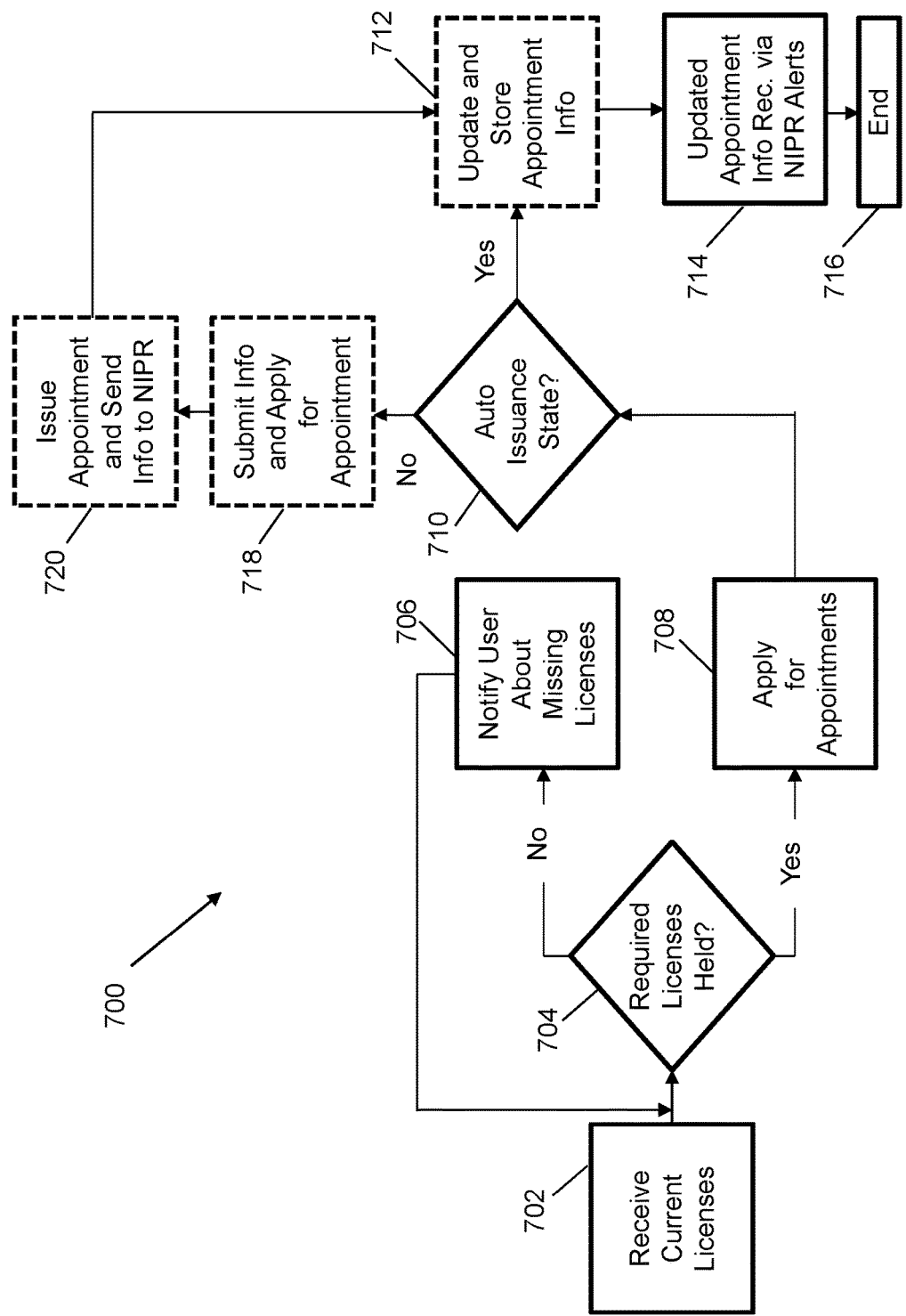
FIG. 7 illustrates a flow chart of another exemplary process that may be carried out by the computer system shown in FIG. 1.

FIG. 7 illustrates an exemplary flow diagram of a process 700 for automatically applying for appointments. For example, the appointments may be applied for by a user to sell and solicit insurance products on behalf of an insurance provider, as described above. In some embodiments, process 700 may be carried out by one or more of a computer system (e.g., system 100 shown in FIG. 1) and/or a processor/server (e.g., LM server 102 or third party server 110 shown in FIG. 1). In the illustrated embodiment, the boxes outlined in a solid line are performed by LM server 102, and the boxes outlined in a dotted line are performed by one or more third party servers 110 (e.g., servers associated with NIPR and/or a Department of Insurance of a state).

Process 700 includes receiving 702 current licenses for a user. For example, the user may be an agent intern looking to receive appointments from an insurance provider or an agent looking to receive additional appointments or renew existing appointments from the insurance provider. Once the current licenses are received 702, it is determined 704 whether the required licenses are held by the user, as described further herein. The required licenses may be licenses required by a state where the user will sell and solicit insurance products and/or the insurance provider. If it is determined 704 by system 100 (e.g., LM server 102 of system 100), as described in more detail above, especially with respect to FIG. 2, that one or more required licenses are not held by the user, the user is notified 706 about the missing licenses. The notification 706 may include one or more of an email, a text alert, and any other suitable notification 706. When additional licenses for the user are received 702, the process 700 starts over until each of the required licenses is held by the user. If it is determined 704 by system 100 (e.g., LM server 102 of system 100), as described in more detail above, especially with respect to FIG. 2, that all of the required licenses are held by the user, one or more appointments are automatically applied 708 for on behalf of the user depending on the appointment preferences of the user and/or the insurance provider.

Process 700 further includes determining 710 by system 100 (e.g., LM server 102 of system 100) whether the user resides and/or will sell and solicit insurance products in an automatic appointment issuance state. If it is determined 710 by system 100 (e.g., LM server 102 of system 100) that the user is in an automatic appointment issuance state, the automatically issued appointment information is updated and stored 712 (e.g., by a server associated with NIPR). The updated 712 appointment information is received 714 (e.g., by LM server 102) via NIPR alerts, and process 700 is ended 716. If it is determined 710 by system 100 (e.g., LM server 102 of system 100) that the user is not in an automatic appointment issuance state, necessary appointment information is submitted and the appointment is applied for 718. The appointment is issued 720 (e.g., by the Department of Insurance of the state), and the issued appointment information is sent 720 (e.g., to the server associated with NIPR). The appointment information is updated and stored 712, the updated 712 appointment information is received 714, and processor 700 is ended 716.

Process 700 may be carried out any time a change in licensure is made and/or any time a change in title for a user is obtained. For example, process 700 may be carried out for each appointed user in a state when the state updates the required licensure by adding additional required licensure for selling and/or soliciting insurance products in the state. Further, process 700 may be carried out when an agent intern becomes an agent, and LM server 102 may link the user's intern and agent accounts such that all of the licenses associated with the user do not have to be obtained again.

Exemplary Computer-Implemented Method for Managing Licenses

Figure 8:
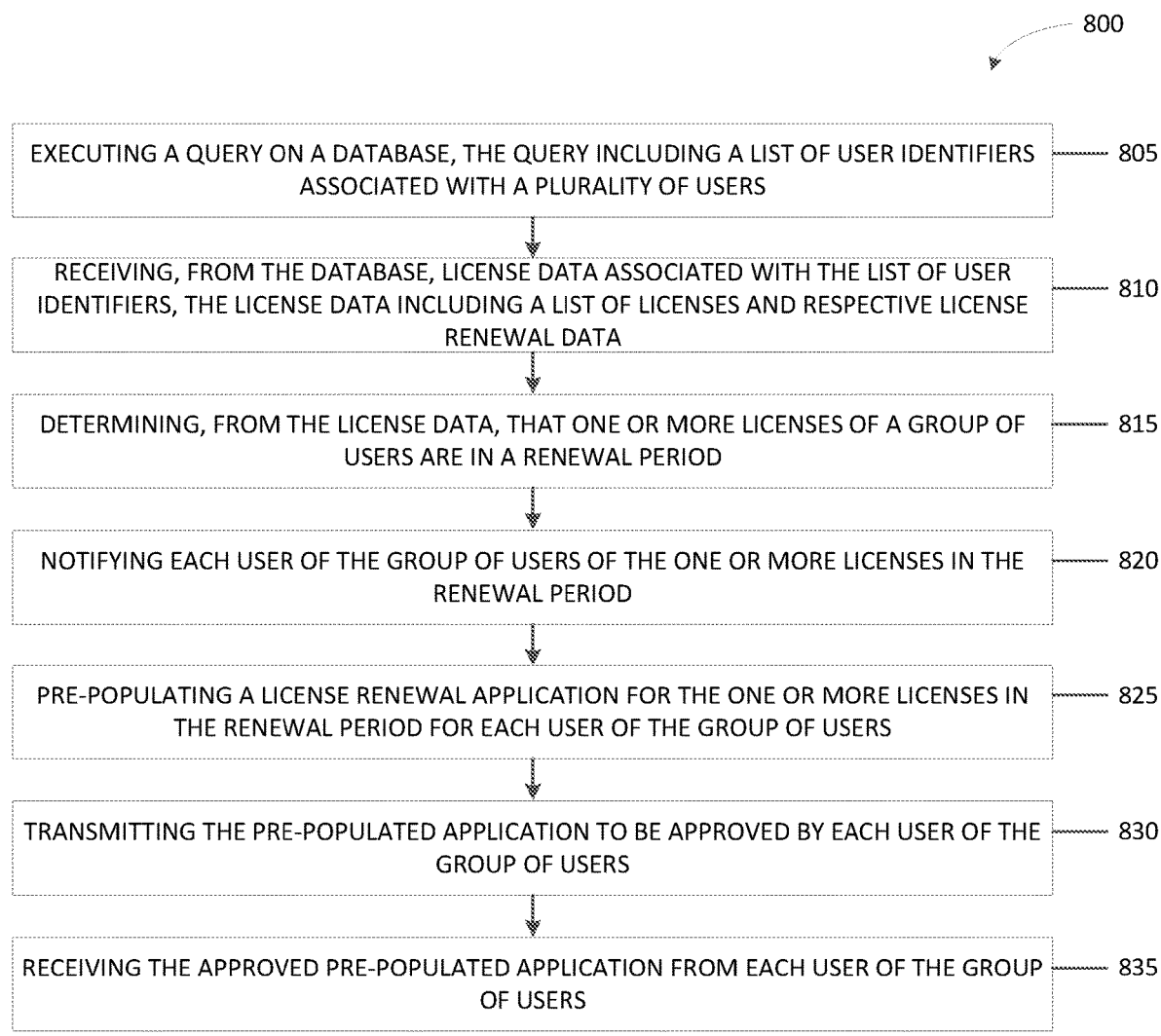
FIG. 8 illustrates a simplified block diagram of an exemplary process that may be carried out by the computer system shown in FIG. 1.

FIG. 8 illustrates an exemplary process 800. In some embodiments, process 800 may be carried out by a computer system and/or processor/server (e.g., LM server 102 shown in FIG. 1).

Process 800 may include executing 805 (e.g., by LM server 102) at least one query on a database. The at least one query may include a list of user identifiers associated with a plurality of users. In response to executed 805 query, process 800 may include receiving 810 (e.g., by LM server 102), from the database, license data. The license data may be associated with the list of user identifiers, and the license data may include at least a list of licenses and respective license renewal data associated with each user of the plurality of users.

Process 800 may further include determining 815 (e.g., by LM server 102), from the license data, that one or more licenses of a group of users is in a renewal period. Further, process 800 may include notifying 820 (e.g., by LM server 102) each user of the group of users of the one or more licenses in the renewal period.

Process 800 may include pre-populating 825 (e.g., by LM server 102) a license renewal application for the one or more licenses in the renewal period for each user of the group of users. The pre-populated 825 applications may be transmitted 830 (e.g., by LM server 102) to be approved by each user of the group of users, and LM server 102 may receive 835 the pre-populated application from each user of the group of users.

Process 800 may further include additional steps, as described herein.

Exemplary Embodiments & Functionality

In one aspect, a computer system for managing licenses may be provided. The computer system may be in communication with at least one database and include at least one processor in communication with at least one memory, and the at least one processor may be programmed to: (i) execute at least one query on the database, wherein the query includes a list of user identifiers associated with a plurality of users, (ii) receive, from the database, license data associated with the list of user identifiers, wherein the license data includes at least a list of licenses and respective license renewal data associated with each user of the plurality of users, (iii) determine, from the license data, that one or more licenses of a group of users is in a renewal period, (iv) notify each user of the group of users of the one or more licenses in the renewal period, (v) pre-populate a license renewal application for the one or more licenses in the renewal period for each user of the group of users, (vi) transmit the pre-populated application to be approved by each user of the group of users, and (vii) receive the approved pre-populated application from each user of the group of users. The computer system may include additional, less, or alternative functionality including that described herein.

For example, the at least one processor may further be programmed to: (i) submit the approved pre-populated applications to the database for further processing, (ii) generate a user profile for each user of the plurality of users, wherein the user profile includes at least a role of each user and the license data associated with each user, (iii) receive, from the license database, a notification that the application for renewal has been processed, (iv) update the user profile to include that the one or more licenses of the user associated with the application for renewal are renewed, (v) store, in the at least one memory device, (a) a location of a place of work for each user, (b) if the user is a manager, a list of users that are team members associated with the manger, and (c) if the user is a team member, a list of one or more users that are managers associated with the team member, (vi) update each user profile to include the location of the place of work, (vii) link the user profiles of the managers and the team members for each location of the place of work, (viii) display, via a user device associated with each user, a user profile associated with the respective user, (ix) display, via a user device associated with each manager, the user profiles of the linked team members associated with the manager, wherein access to the user profiles of the linked team members is restricted to the manager, (x) store, in the at least one memory device, business rules associated with the insurance provider, wherein the business rules include at least which licenses are necessary based upon the role of the user, (xi) determine, for each user profile based upon the stored business rules, whether each user has the necessary licenses for the role of the user, (xii) generate, if the user has the necessary licenses for the role of the user, a message indicating that the user has the necessary licenses in the user profile, and (xiii) transmit, if the user is a team member, the message indicating that the user has the necessary licenses to the linked manager of the user.

Further, the at least one processor may further be programmed to: (i) determine, if the user does not have the necessary licenses for the role of the user, a list of necessary licenses that the user must obtain, (ii) transmit a notification to the user including the list of necessary licenses that the user must obtain, (iii) generate a message indicating that the user does not have the necessary licenses in the user profile, (iv) prompt the user to provide input regarding the necessary licenses, wherein the input includes a status update associated with progress of the user obtaining the necessary licenses, (v) utilize at least one of machine learning and artificial intelligence techniques to compare the user profile of a candidate user to the user profiles of other users similar to the candidate user, (vi) determine one or more discrepancies between the user profile of the candidate user and the user profiles of the similar users, wherein the one or more discrepancies includes licenses that the user does not have and the similar users have, (vii) flag the user profile of the candidate user, wherein the flag includes the one or more discrepancies between the user profile of the candidate user and the user profiles of similar users, (viii) transmit, if the user is a team member, the message indicating that the user does not have the necessary licenses to the linked manager of the user, (ix) generate a flag for the user profile, wherein the flag is included in the user profile when the user profile is viewed by at least one of the user and the linked manager of the user, (x) execute a query of the continuing education database, (xi) receive, from the continuing education database, continuing education data associated with each user, and (xii) update the user profile for each user to include the continuing education data associated with each user.

Further, the at least one processor may further be programmed to: (i) determine, for each user profile based upon the stored business rules, whether each user has the necessary continuing education requirements for the role of the user, (ii) generate a message indicating whether the user has the necessary continuing education credits in the user profile, (iii) transmit the message indicating whether the user has the necessary continuing education credits to the linked manager of the user, (iv) receive a license analytics request, wherein the request includes specifications for license metrics associated with the user profiles, wherein the license metrics include at least one of a number of user profiles that have specific licenses associated with the user profiles for a specific area, a number of user profiles that sell insurance products for an insurance provider for the specific area, and a number of user profiles associated with a managing role or a supporting role for the specific area, (v) execute at least one query on the user profiles, wherein the query includes the license metrics, (vi) generate, based upon the user profiles from the query, a license analytics report, (vii) store, in the at least one memory device, the license analytics report, (viii) receive, from a user device associated with a user of the plurality of users, a list of one or more user identifiers associated with a restricted employee list, wherein the restricted employee list is associated with users that were terminated by or are otherwise in bad standing with an insurance provider, (ix) execute a query on the license database, wherein the query includes the list of user identifiers associated with the restricted employee list, (x) determine whether any user identifiers associated with the restricted employee list have applied for positions associated with the insurance provider, and (xi) generate, if any user identifiers associated with the restricted employee list have applied for positions associated with the insurance provider, a flag for the user profiles associated with the user identifiers, wherein the flag includes a message on the user profile that the user associated with the user profile is on the restricted employee list.

In another aspect, a computer-implemented method for managing licenses may be provided. The method may be implemented on a computer system including at least one processor in communication with at least one memory device, and the method may include: (i) executing at least one query on the database, wherein the query includes a list of user identifiers associated with a plurality of users, (ii) receiving, from the database, license data associated with the list of user identifiers, wherein the license data includes at least a list of licenses and respective license renewal data associated with each user of the plurality of users, (iii) determining, from the license data, that one or more licenses of a group of users is in a renewal period, (iv) notifying each user of the group of users of the one or more licenses in the renewal period, (v) pre-populating a license renewal application for the one or more licenses in the renewal period for each user of the group of users, (vi) transmitting the pre-populated application to be approved by each user of the group of users, and (vii) receiving the approved pre-populated application from each user of the group of users. The method may include additional, fewer, or alternative actions, including those discussed elsewhere herein.

In another aspect, at least one non-transitory computer-readable storage media having computer-executable instructions there on may be provided. When executed by at least one processor in communication with at least one memory device and a database, the computer-executable instructions may cause the at least one processor to: (i) execute at least one query on the database, wherein the query includes a list of user identifiers associated with a plurality of users, (ii) receive, from the database, license data associated with the list of user identifiers, wherein the license data includes at least a list of licenses and respective renewal periods associated with each user of the plurality of users, (iii) determine, from the license data, one or more licenses of each user in the renewal period, (iv) notify each user of the one or more licenses in the renewal period, (v) prompt each user with a pre-populated application for approval, (vi) receive the approved pre-populated application for renewal for the one or more licenses from each user, and (vii) transmit the application for renewal to the database for further processing. The instructions may direct additional, fewer, or alternate functionality, including that discussed elsewhere herein.

In yet another aspect, a computer system for managing licenses may be provided. The computer system may be in communication with at least one database and include at least one processor in communication with at least one memory, and the at least one processor may be programmed to: (i) execute at least one query on the database, wherein the query includes a list of user identifiers associated with a plurality of users, (ii) receive, from the database, license data associated with the list of user identifiers, wherein the license data includes at least a list of licenses and respective license renewal data associated with each user of the plurality of users, (iii) determine, from the license data, that one or more licenses of a group of users is in a renewal period, (iv) notify each user of the group of users of the one or more licenses in the renewal period, (v) pre-populate a license renewal application for the one or more licenses in the renewal period for each user of the group of users, (vi) transmit the pre-populated application to be approved by each user of the group of users, and (vii) receive the approved pre-populated application from each user of the group of users. The computer system may include additional, fewer, or alternative functionality, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, documents to be provided, the model being simulated, home owner and/or home, buyer, geolocation information, image data, home sensor data, and/or other data.

Based upon these analyses, the processing element may learn how to identify characteristics and patterns that may then be applied to training models, analyzing sensor data, authentication data, image data, mobile device data, and/or other data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system comprising at least one processor in communication with at least one memory device, and at least one database, wherein the at least one processor is programmed to:
   execute at least one query on the database, wherein the query includes a list of user identifiers associated with a plurality of users;
   receive, from the database, license data associated with the list of user identifiers, wherein the license data includes at least a list of licenses and respective license renewal data associated with each user of the plurality of users;
   generate a user profile for each user of the plurality of users, wherein the user profile includes at least a role of the respective user, one or more locations of practice of the respective user, and the license data associated with the respective user;
   train, utilizing at least one of machine learning and artificial intelligence techniques, a model to determine requirements for each user of the plurality of users based upon matching user profiles, wherein the matching user profiles include matching roles and matching locations of practice;
   compare, utilizing the trained model, the user profile of a candidate user to the determined requirements of the candidate user;
   determine, from the comparison, one or more discrepancies between the user profile of the candidate user and the determined requirements, wherein the one or more discrepancies include licenses in the determined requirements that are not included in the user profile of the candidate user;
   determine, from the license data, that one or more licenses of the candidate user is in a renewal period;
   notify the candidate user of (i) the one or more discrepancies in the user profile of the candidate user and (ii) the one or more licenses in the renewal period;
   generate a prompt for the candidate user to respond to the one or more discrepancies;
   pre-populate a license renewal application for the one or more licenses in the renewal period for the candidate user;
   transmit, to the candidate user, the prompt and the pre-populated application to be approved by the candidate user;
   receive, from the candidate user, user input associated with the prompt and the approved pre-populated application; and
   update the user profile of the candidate user to include the user input and the pre-populated application.

2. The computer system of claim 1, wherein the at least one processor is further programmed to:
   submit the approved pre-populated application to the database for further processing;
   receive, from the database, a notification that the application for renewal has been processed; and
   further update the user profile of the candidate user to include that the one or more licenses of the candidate user are renewed.

3. The computer system of claim 1, wherein the roles of the users include a manager and a team member, and wherein the processor is further programmed to:
   store, in the at least one memory device, (i) a location of a place of work for each user, (ii) if the user is a manager, a list of users that are team members associated with the manger manager, and (iii) if the user is a team member, a list of one or more users that are managers associated with the team member; and
   link the user profiles of the managers and the team members for each location of the place of work.

4. The computer system of claim 3, wherein the processor is further programmed to:
   display, via a user device associated with each user, a user profile associated with the respective user; and
   display, via a user device associated with each manager, the user profiles of the linked team members associated with the manager, wherein access to the user profiles of the linked team members is restricted to the manager.

5. The computer system of claim 4, wherein the users are associated with selling insurance products for an insurance provider, wherein the computer system is associated with the insurance provider, and wherein the at least one processor is further programmed to:
   store, in the at least one memory device, business rules associated with the insurance provider, wherein the business rules include at least which licenses are necessary based upon the role of the user;
   determine, for each user profile based upon the stored business rules, whether each user has the necessary licenses for the role of the user;
   generate, if the user has the necessary licenses for the role of the user, a message indicating that the user has the necessary licenses in the user profile; and
   transmit, if the user is a team member, the message indicating that the user has the necessary licenses to the linked manager of the user.

6. The computer system of claim 5, wherein the user input includes a status update, and wherein the at least one processor is further programmed to:
   determine, if the user does not have the necessary licenses for the role of the user, a list of necessary licenses that the user must obtain;
   transmit a notification to the user including the list of necessary licenses that the user must obtain; and generate a message indicating that the user does not have the necessary licenses in the user profile.

7. The computer system of claim 5, wherein the at least one processor is further programmed to:
 flag the user profile of the candidate user, wherein the flag includes the one or more discrepancies between the user profile of the candidate user and the determined requirements.

8. The computer system of claim 7, wherein the at least one processor is further programmed to:
 transmit, if the user is a team member, the message indicating that the user does not have the necessary licenses to the linked manager of the user; and
 generate a flag for the user profile of the candidate user, wherein the flag is included in the user profile of the candidate user when the user profile of the candidate user is viewed by at least one of the candidate user and the linked manager of the candidate user.

9. The computer system of claim 8, wherein the computer system is further in communication with at least one continuing education database, wherein the business rules further include continuing education requirements necessary for each role, and wherein the at least one processor is further programmed to:
 execute a query of the continuing education database;
 receive, from the continuing education database, continuing education data associated with each user; and
 update the user profile for each user to include the continuing education data associated with each user.

10. The computer system of claim 9, wherein the business rules further include continuing education requirements necessary for each role, and wherein the at least one processor is further programmed to:
 determine, for each user profile based upon the stored business rules, whether each user has the necessary continuing education requirements for the role of the user;
 generate a message indicating whether the user has the necessary continuing education credits in the user profile; and
 transmit the message indicating whether the user has the necessary continuing education credits to the linked manager of the user.

11. The computer system of claim 1, wherein the processor is further configured to:
 receive a license analytics request, wherein the request includes specifications for license metrics associated with the user profiles, wherein the license metrics include at least one of a number of user profiles that have specific licenses associated with the user profiles for a specific area, a number of user profiles that sell insurance products for an insurance provider for the specific area, and a number of user profiles associated with a managing role or a supporting role for the specific area;
 execute at least one query on the user profiles, wherein the query includes the license metrics;
 generate, based upon the user profiles from the query, a license analytics report; and
 store, in the at least one memory device, the license analytics report.

12. The computer system of claim 1, wherein the at least one processor is further configured to:
 receive, from a user device associated with an administrative user of the plurality of users, a list of one or more user identifiers associated with a restricted employee list, wherein the restricted employee list is associated with users that were terminated by or are otherwise in bad standing with an insurance provider;
 execute a query on the database, wherein the query includes the list of user identifiers associated with the restricted employee list;
 determine whether any user identifiers associated with the restricted employee list have applied for positions associated with the insurance provider; and
 generate, if any user identifiers associated with the restricted employee list have applied for positions associated with the insurance provider, a flag for the user profiles associated with the user identifiers, wherein the flag includes a message on the user profile that the user associated with the user profile is on the restricted employee list.

13. The computer system of claim 1, wherein the license data further includes one or more of current appointment information for each user, historical appointment information for each user including prior appointments and terminations of appointments, and line-of-authority data.

14. A computer-implemented method implemented on a computer system including at least one processor in communication with at least one memory device, and at least one database, said method comprising:
 executing at least one query on the database, wherein the query includes a list of user identifiers associated with a plurality of users;
 receiving, from the database, license data associated with the list of user identifiers, wherein the license data includes at least a list of licenses and respective license renewal data associated with each user of the plurality of users;
 generating a user profile for each user of the plurality of users, wherein the user profile includes at least a role of the respective user, one or more locations of practice of the respective user, and the license data associated with the respective user;
 training, utilizing at least one of machine learning and artificial intelligence techniques, a model to determine requirements for each user of the plurality of users based upon matching user profiles, wherein the matching user profiles include matching roles and matching locations of practice;
 compare, utilizing the trained model, the user profile of a candidate user to the determined requirements of the candidate user;
 determining, from the comparison, one or more discrepancies between the user profile of the candidate user and the determined requirements, wherein the one or more discrepancies include licenses in the determined requirements that are not included in the user profile of the candidate user;
 determining, from the license data, that one or more licenses of the candidate user is in a renewal period;
 notifying the candidate user of (i) the one or more discrepancies in the user profile of the candidate user and (ii) the one or more licenses in the renewal period;
 generating a prompt for the candidate user to respond to the one or more discrepancies;
 pre-populating a license renewal application for the one or more licenses in the renewal period for the candidate user;
 transmitting, to the candidate user, the prompt and the pre-populated application to be approved by the candidate user;

receiving, from the candidate user, user input associated with the prompt and the approved pre-populated application; and updating the user profile of the candidate user to include the user input and the pre-populated application.

15. The method of claim 14 further comprising:

submitting the approved pre-populated application to the database for further processing;

receiving, from the database, a notification that the application for renewal has been processed; and further updating the user profile of the candidate user to include that the one or more licenses of the candidate user associated are renewed.

16. The method of claim 15 further comprising:

storing, in the at least one memory device, (i) a location of a place of work for each user, (ii) if the user is a manager, a list of users that are team members associated with the manager, and (iii) if the user is a team member, a list of one or more users that are managers associated with the team member; and linking the user profiles of the managers and the team members for each location of the place of work.

17. The method of claim 16 further comprising:

displaying, via a user device associated with each user, a user profile associated with the respective user; and displaying, via a user device associated with each manager, the user profiles of the linked team members associated with the manager, wherein access to the user profiles of the linked team members is restricted to the manager.

18. The method of claim 17 further comprising:

storing, in the at least one memory device, business rules associated with an insurance provider, wherein the business rules include at least which licenses are necessary based upon the role of the user;

determining, for each user profile based upon the stored business rules, whether each user has the necessary licenses for the role of the user;

generating, if the user has the necessary licenses for the role of the user, a message indicating that the user has the necessary licenses in the user profile; and transmitting, if the user is a team member, the message indicating that the user has the necessary licenses to the linked manager of the user.

19. The method of claim 18, wherein the user input includes a status update, and wherein the method further comprises:

determining, if the user does not have the necessary licenses for the role of the user, a list of necessary licenses that the user must obtain;

transmitting a notification to the user including the list of necessary licenses that the user must obtain; and generating a message indicating that the user does not have the necessary licenses in the user profile.

20. At least one non-transitory computer-readable storage media having computer-executable instructions embodied thereon, wherein when executed by at least one processor in communication with at least one memory device, and at least one database, the computer-executable instructions cause the at least one processor to:

execute at least one query on the database, wherein the query includes a list of user identifiers associated with a plurality of users;

receive, from the database, license data associated with the list of user identifiers, wherein the license data includes at least a list of licenses and respective license renewal data associated with each user of the plurality of users;

generate a user profile for each user of the plurality of users, wherein the user profile includes at least a role of the respective user, one or more locations of practice of the respective user, and the license data associated with the respective user;

train, utilizing at least one of machine learning and artificial intelligence techniques, a model to determine requirements for each user of the plurality of users based upon matching user profiles, wherein the matching user profiles include matching roles and matching locations of practice;

compare, utilizing the trained model, the user profile of a candidate user to the determined requirements of the candidate user;

determine, from the comparison, one or more discrepancies between the user profile of the candidate user and the determined requirements, wherein the one or more discrepancies include licenses in the determined requirements that are not included in the user profile of the candidate user;

determine, from the license data, that one or more licenses of candidate user is in a renewal period;

notify the candidate user of (i) the one or more discrepancies in the user profile of the candidate user and (ii) the one or more licenses in the renewal period;

generate a prompt for the candidate user to respond to the one or more discrepancies;

pre-populate a license renewal application for the one or more licenses in the renewal period for the candidate user;

transmit, to the candidate user, the prompt and the pre-populated application to be approved by the candidate user;

receive, from the candidate user, user input associated with the prompt and the approved pre-populated application; and update the user profile of the candidate user to include the user input and the pre-populated application.

* * * * *